United States Patent
Mattia

(10) Patent No.: US 9,909,471 B2
(45) Date of Patent: Mar. 6, 2018

(54) NOISE ATTENUATING ACOUSTIC PANEL

(71) Applicant: United Technologies Corporation, Hartford, CT (US)

(72) Inventor: Stephen H. Mattia, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/804,631

(22) Filed: Jul. 21, 2015

(65) Prior Publication Data
US 2016/0017775 A1 Jan. 21, 2016

Related U.S. Application Data

(60) Provisional application No. 62/026,932, filed on Jul. 21, 2014.

(51) Int. Cl.
*F02C 7/045* (2006.01)
*F02K 1/82* (2006.01)
*F01N 1/08* (2006.01)

(52) U.S. Cl.
CPC .............. *F01N 1/082* (2013.01); *F02C 7/045* (2013.01); *F02K 1/827* (2013.01); *F05D 2250/63* (2013.01); *F05D 2260/962* (2013.01); *F05D 2260/963* (2013.01)

(58) Field of Classification Search
CPC .................................. F02C 7/045; F02K 1/827
USPC .......................................... 181/213, 214, 292
See application file for complete search history.

(56) References Cited

U.S. PATENT DOCUMENTS

| 3,819,007 | A | * | 6/1974 | Wirt | ........................ | E04B 1/86 181/286 |
| 3,887,031 | A | * | 6/1975 | Wirt | ........................ | E04B 1/86 181/286 |
| 4,231,447 | A | * | 11/1980 | Chapman | .................. | F01N 1/02 181/213 |
| 4,671,841 | A | | 6/1987 | Stephens | | |
| 4,944,362 | A | * | 7/1990 | Motsinger | ............... | F02K 1/827 181/213 |
| 5,807,628 | A | | 9/1998 | Mnich et al. | | |
| 6,461,003 | B1 | | 10/2002 | Neudeck | | |
| 6,758,388 | B1 | | 7/2004 | Leholm et al. | | |
| 7,337,875 | B2 | * | 3/2008 | Proscia | ................... | F02C 7/045 181/210 |
| 7,588,212 | B2 | | 9/2009 | Moe et al. | | |
| 8,235,171 | B2 | | 8/2012 | Douglas et al. | | |
| 8,955,643 | B2 | * | 2/2015 | Liu | ........................ | F02C 7/045 181/213 |

(Continued)

FOREIGN PATENT DOCUMENTS

GB 2452476 3/2009

OTHER PUBLICATIONS

EP search report for EP15177707.5 dated Dec. 14, 2015.

*Primary Examiner* — Jeremy Luks
(74) *Attorney, Agent, or Firm* — O'Shea Getz P.C.

(57) ABSTRACT

An acoustic panel is provided that includes a first layer, a perforated second layer, a core and a noise attenuating feature. The core forms a chamber between the first and the second layers. The noise attenuating feature projects partially into the chamber. The noise attenuating feature is formed integral with the first layer, the second layer and/or the core.

19 Claims, 11 Drawing Sheets

(56) References Cited

U.S. PATENT DOCUMENTS

| | | | |
|---|---|---|---|
| 2002/0070077 A1* | 6/2002 | Porte | G10K 11/172 |
| | | | 181/292 |
| 2012/0090693 A1* | 4/2012 | Chelin | B64D 15/04 |
| | | | 137/15.1 |
| 2013/0063661 A1 | 3/2013 | Toita | |
| 2013/0064661 A1 | 3/2013 | Evans et al. | |
| 2015/0041248 A1* | 2/2015 | Ichihashi | E04B 1/84 |
| | | | 181/292 |

* cited by examiner

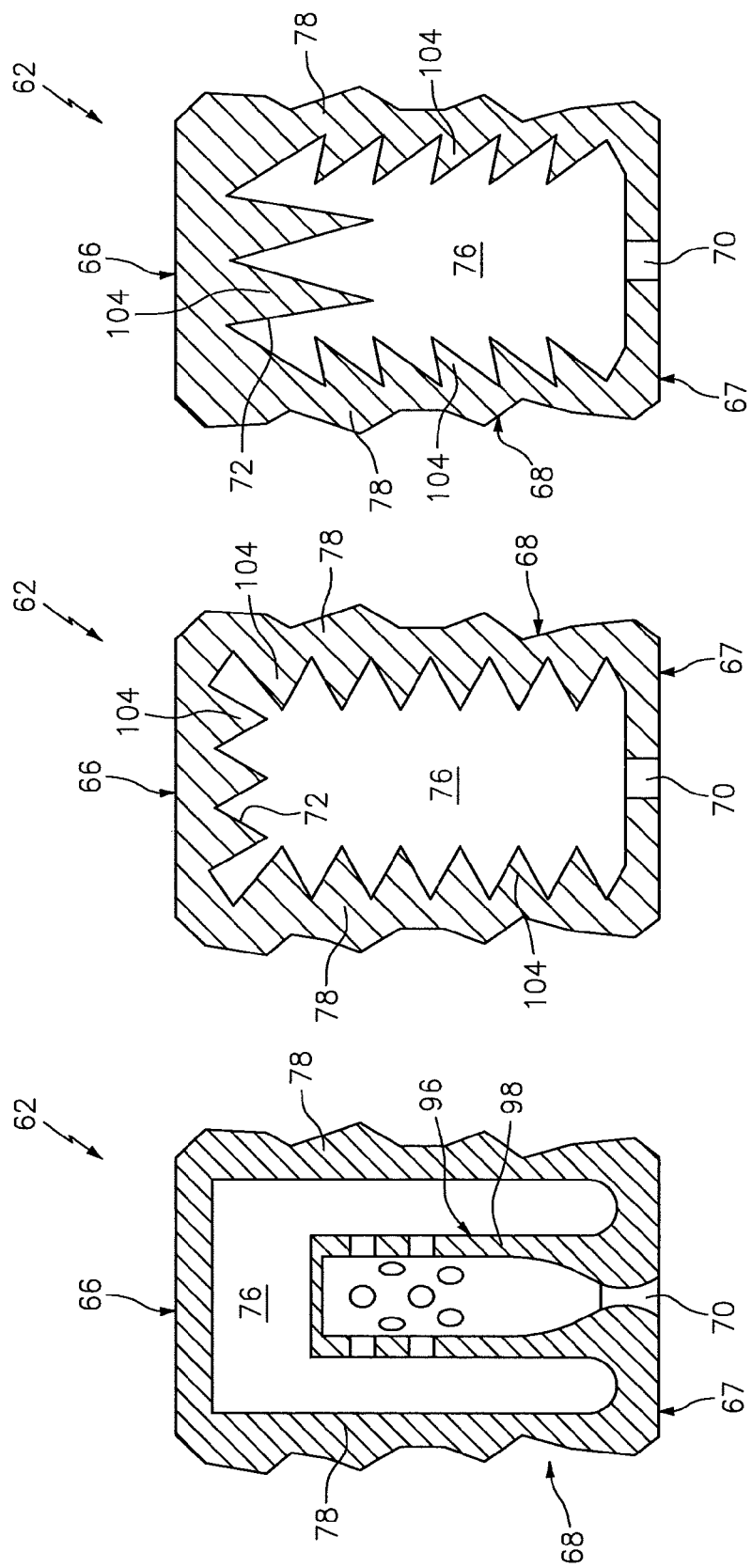

NOISE ATTENUATING ACOUSTIC PANEL

This application claims priority to U.S. Patent Appln. No. 62/026,932 filed Jul. 21, 2014.

BACKGROUND OF THE INVENTION

1. Technical Field

This disclosure relates generally to an acoustic panel and, more particularly, to an acoustic panel for attenuating noise generated during, for example, operation of a turbine engine.

2. Background Information

A gas turbine engine may include an acoustic sandwich panel for attenuating noise generated during turbine engine operation. A typical acoustic sandwich panel includes a honeycomb core bonded between a solid face sheet and a perforated face sheet. The honeycomb core includes a plurality of resonating cavities. The honeycomb core has a thickness sized to tune the resonating cavities to a specific target frequency of noise to be attenuated. As a result, noise energy reflected by the acoustic sandwich panel interacts with noise energy traveling towards the panel. Differences in phase between the noise energy in an acoustic field adjacent the perforated face sheet may enable the reflected noise energy to destructively interfere with and attenuate the noise energy traveling towards the acoustic sandwich panel.

Modern engine designs may require acoustic sandwich panels to attenuate noise energy with relatively low frequencies while utilizing substantially the same or less space than previous panels. Attenuating low frequencies, however, may increase the thickness of the honeycomb core and, thus, the thickness of the acoustic sandwich panel. There is a need in the art therefore for an improved noise attenuating acoustic panel.

SUMMARY OF THE DISCLOSURE

According to an aspect of the invention, an acoustic panel is provided that includes a first layer, a perforated second layer, a core and a noise attenuating feature. The core forms a chamber between the first and the second layers. The noise attenuating feature projects partially into the chamber. The noise attenuating feature may be formed integral with the first layer, the second layer and/or the core.

According to another aspect of the invention, an apparatus is provided for a turbine engine. This turbine engine apparatus includes an acoustic panel which includes at least one muffler. The muffler is configured internally within the panel. The muffler is also configured to attenuate noise generated during operation of the turbine engine.

According to another aspect of the invention, a manufacturing method is provided. This method includes forming an acoustic panel, where the acoustic panel includes a noise attenuating feature that projects partially into an internal chamber of the acoustic panel. At least the noise attenuating feature is formed using an additive manufacturing system.

The acoustic panel may be formed as a unitary body using the additive manufacturing system.

The noise attenuating feature may include or be configured as a baffle.

The noise attenuating feature may include or be configured as a muffler.

The noise attenuating feature may include or be configured as a tube. This tube may be fluidly and/or acoustically coupled between a perforation in the second layer and the chamber. A sidewall of the tube may be perforated or solid (e.g., non-perforated).

The noise attenuating feature may include or be configured as a cone or a pyramid or any other type of protrusion.

The noise attenuating feature may be one of a plurality of noise attenuating features projecting partially into the chamber. Each of the noise attenuating features may be formed integral with the first layer, the second layer and/or the core.

The noise attenuating features may be configured to provide at least a portion of a surface, which defines at least a portion of the chamber, with a surface roughness between about 250 Ra and about 2,000 Ra.

The core may form a second chamber between the first and the second layers. The chamber and the second chamber may be fluidly discrete.

The core may form a second chamber between the first and the second layers. The chamber and the second chamber may be fluidly coupled through one or more apertures in the core.

The core may include one or more protrusions that extend between the first and the second layers through the chamber.

The core may be formed integral with the first layer and/or the second layer.

The acoustic panel may include a first layer and a perforated second layer. The muffler may extend between the first and the second layers.

The muffler may include or be configured as a plurality of baffles. These baffles may be configured to form a plurality of chambers (e.g., sub-chambers) within the acoustic panel. At least some of the baffles may be interconnected by one or more webs.

The muffler may include or be configured as one or more tubes. Each of the one or more tubes may be fluidly and/or acoustically coupled with a respective perforation in the acoustic panel.

The acoustic panel may include one or more internal canted surfaces positioned opposite an orifice of one or some or each of the one or more tubes.

The foregoing features and the operation of the invention will become more apparent in light of the following description and the accompanying drawings.

BRIEF DESCRIPTION OF THE DRAWINGS

FIG. 11 is a cross-sectional illustration of a portion of another acoustic panel.

FIG. 12 is a cross-sectional illustration of a portion of another acoustic panel.

FIG. 13 is a cross-sectional illustration of a portion of another acoustic panel.

DETAILED DESCRIPTION OF THE INVENTION

Figure 1:
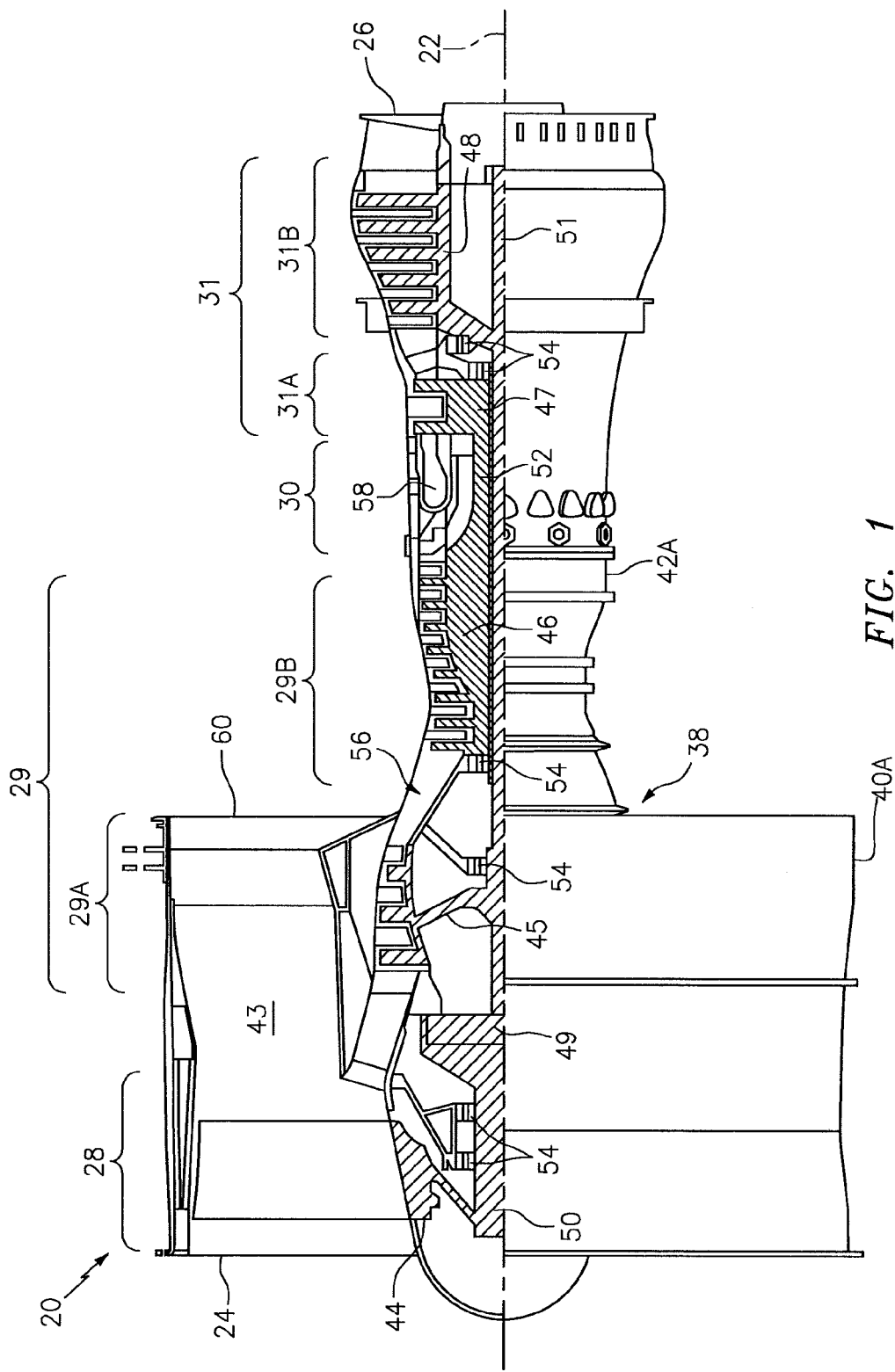
FIG. 1 is a side cutaway illustration of a geared turbine engine.

FIG. 1 is a side cutaway illustration of a geared turbine engine 20; e.g., a geared turbofan engine. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

Figure 2:
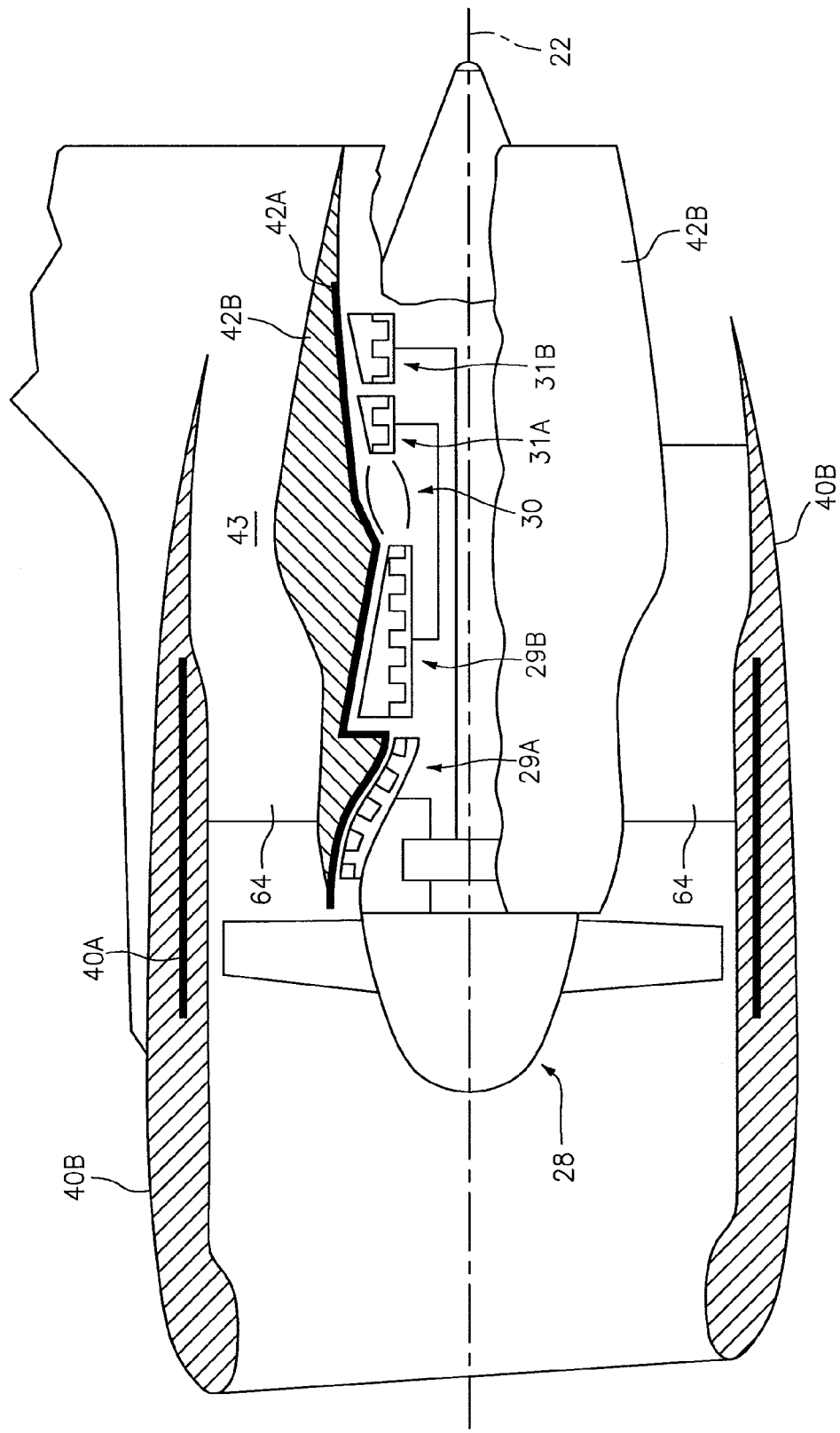
FIG. 2 is another side cutaway illustration of the turbine engine of FIG. 1.

The engine sections 28-31 are arranged sequentially along the centerline 22 within an engine housing 38. This housing 38 includes an outer case 40A (e.g., a fan case) and an inner case 42A (e.g., a core case). The inner case 42A may house one or more of the engine sections 29-31; e.g., an engine core. The outer case 40A may house at least the fan section 28. Referring to FIG. 2, the engine housing 38 also includes an outer nacelle 40B and an inner nacelle 42B. The inner nacelle 42B houses and is configured to provide an aerodynamic cover for the inner case 42A. The outer nacelle 40B houses and is configured to provide an aerodynamic cover for the outer case 40A. The outer nacelle 40B also axially overlaps at least a forward portion of the inner nacelle 42B, thereby defining a bypass gas path 43 radially between the nacelles 40B and 42B.

Referring again to FIG. 1, each of the engine sections 28, 29A, 29B, 31A and 31B includes a respective rotor 44-48. Each of these rotors 44-48 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 44 is connected to a gear train 49, for example, through a fan shaft 50. The gear train 49 and the LPC rotor 45 are connected to and driven by the LPT rotor 48 through a low speed shaft 51. The HPC rotor 46 is connected to and driven by the HPT rotor 47 through a high speed shaft 52. The shafts 50-52 are rotatably supported by a plurality of bearings 54; e.g., rolling element and/or thrust bearings. Each of these bearings 54 is connected to the engine housing 38 by at least one stationary structure such as, for example, an annular support strut.

During operation, air enters the turbine engine 20 through the airflow inlet 24, and is directed through the fan section 28 and into a core gas path 56 and the bypass gas path 43. The air within the core gas path 56 may be referred to as "core air". The air within the bypass gas path 43 may be referred to as "bypass air". The core air is directed through the engine sections 29-31, and exits the turbine engine 20 through the airflow exhaust 26 to provide forward engine thrust. Within the combustor section 30, fuel is injected into a combustion chamber 58 and mixed with the core air. This fuel-core air mixture is ignited to power the turbine engine 20. The bypass air is directed through the bypass gas path 43 and out of the turbine engine 20 through a bypass nozzle 60 to provide additional forward engine thrust. Alternatively, at least some of the bypass air may be directed out of the turbine engine 20 through a thrust reverser to provide reverse engine thrust.

Figure 3:
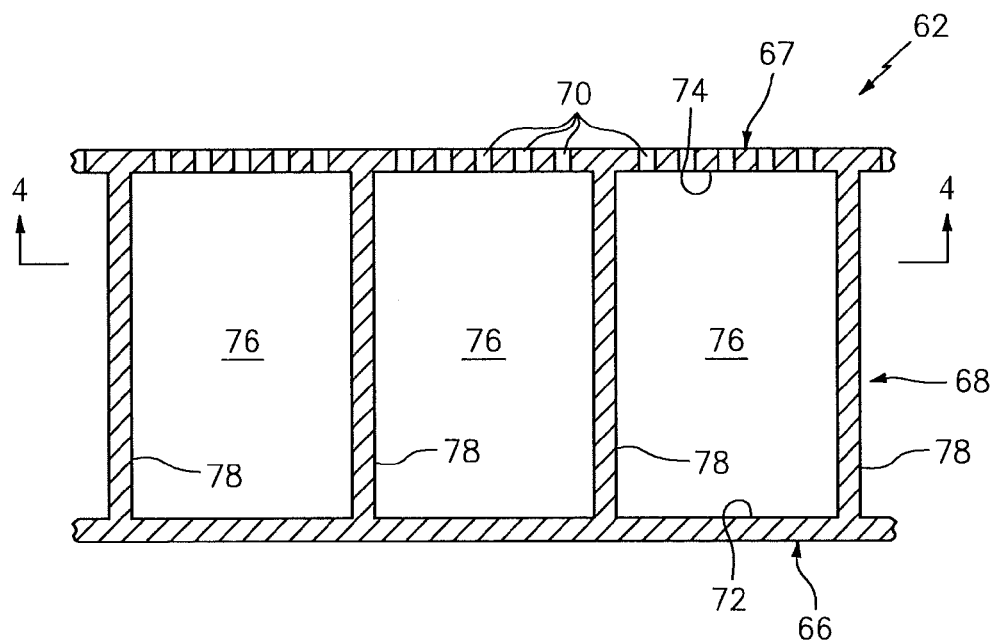
FIG. 3 is a cross-sectional illustration of a portion of an acoustic panel.
Figure 4:
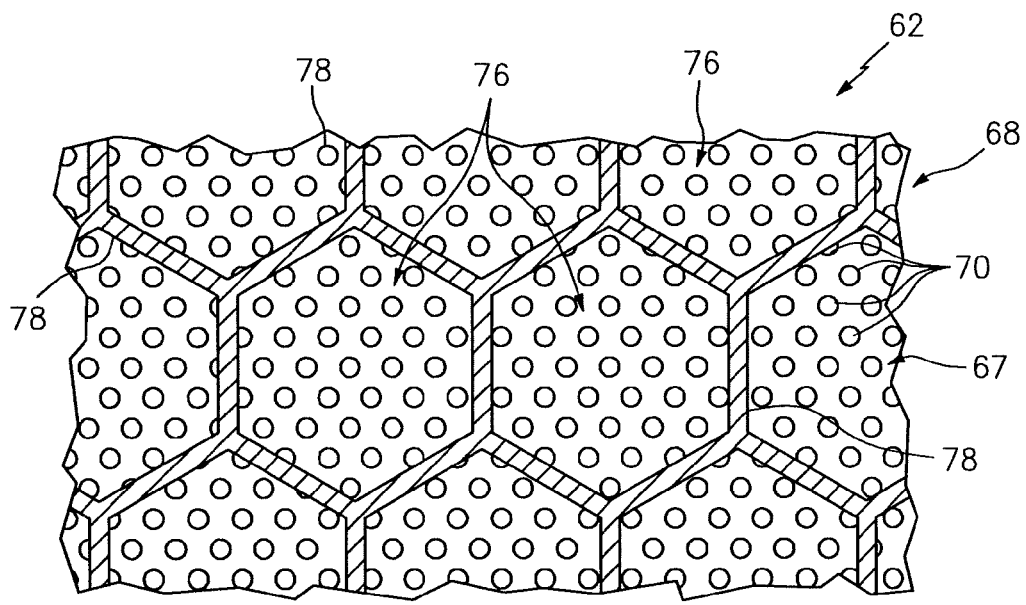
FIG. 4 is a side sectional illustration of the acoustic panel of FIG. 3.

FIGS. 3 and 4 illustrate an acoustic panel 62 configured to attenuate noise generated, for example, during operation of the turbine engine 20. Such an acoustic panel may be shaped and arranged, referring now to FIG. 2, to form at least a portion of the inner nacelle 42B and/or the outer nacelle 40B. Such an acoustic panel may also or alternatively be shaped and arranged to form at least a portion of a bifurcation (or pylon) nacelle 64. The acoustic panel 62 of FIGS. 3 and 4, however, is not limited to forming or being included in the exemplary turbine engine housing structures described above. Furthermore, an acoustic panel such as that shown in FIGS. 3 and 4 may also or alternatively be included in or at least partially form other turbine engine structures and/or aircraft (e.g., fuselage) structures other than those described herein.

Referring again to FIGS. 3 and 4, the acoustic panel 62 includes a substantially solid (e.g., non-perforated) first layer 66, a perforated second layer 67 and a core 68. The acoustic panel 62 also includes one or more noise attenuating features (e.g., see FIGS. 6-19), as will be described below in further detail.

The first layer 66 may be configured as a skin (e.g., a face sheet) of the acoustic panel 62. The first layer 66 may be formed as a generally non-perforated sheet of material.

The second layer 67 may be configured as another skin (e.g., a face sheet) of the acoustic panel 62. The second layer 67 may be formed as a generally perforated sheet of material. The second layer 67 includes one or more perforations 70; e.g., through-holes or pores.

The core 68 is arranged and may extend laterally between the first layer 66 and the second layer 67. The core 68, for example, may be attached to or formed integral with the first layer 66 at (e.g., on, adjacent or proximate) its inner surface 72. The core 68 may also or alternatively be connected to or formed integral with the second layer 67 at its inner surface 74.

The core 68 may be configured to provide the acoustic panel 62 with one or more interior chambers 76 (e.g., cavities). The core 68 of FIGS. 3 and 4, for example, includes a plurality of chamber walls 78 configured into a honeycomb structure. With this configuration, each interior chamber 76 may be transversely defined between an opposing set of the chamber walls 78 and may be laterally defined between the first layer 66 and the second layer 67. Furthermore, each interior chamber 76 may be aligned and fluidly coupled with one or more of the perforations 70 in the second layer 67. In this manner, noise (e.g., undesirable sound waves) generated during operation of the turbine engine 20 may travel into the acoustic panel 62 (e.g., through the perforations 70 and into the chambers 76) for attenuation as described below in further detail.

Figure 5:
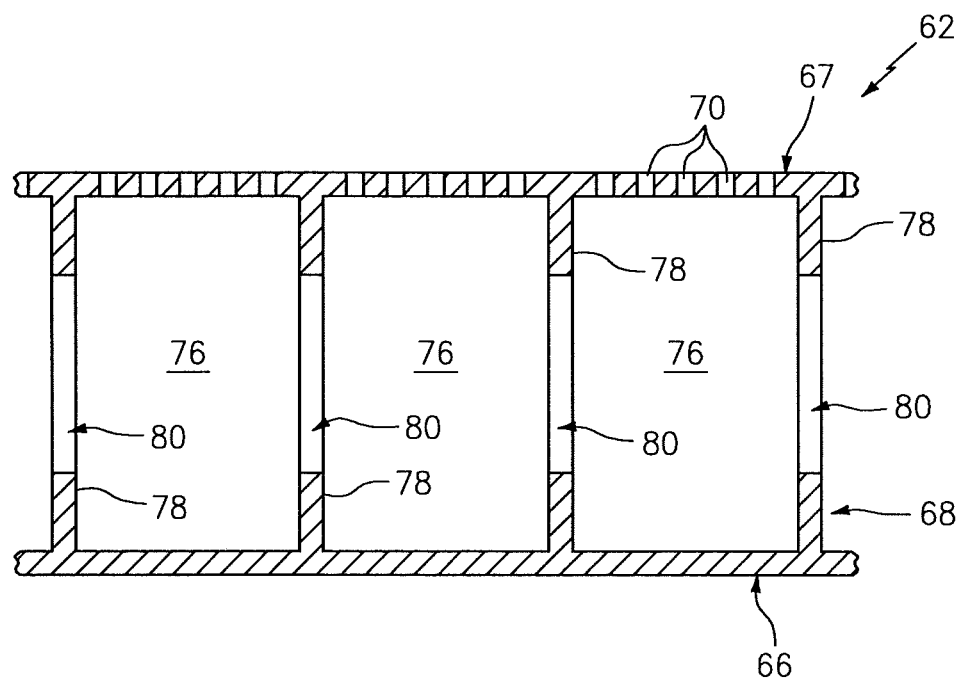
FIG. 5 is a cross-sectional illustration of a portion of another acoustic panel.
Figure 6:
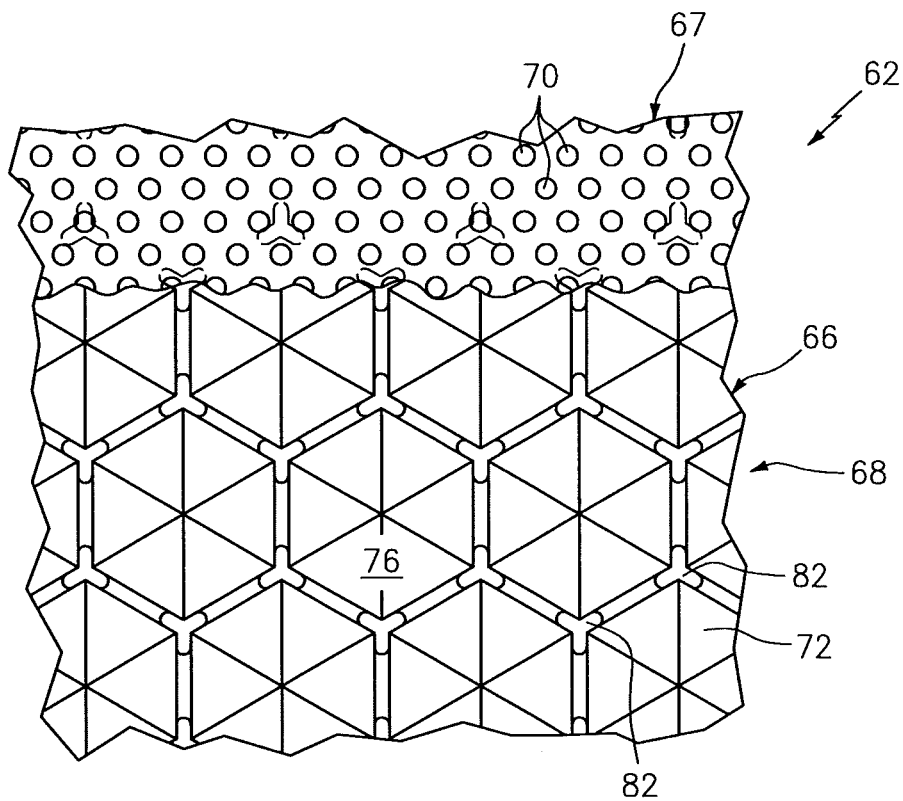
FIG. 6 is a cutaway illustration of a portion of another acoustic panel.
Figure 7:
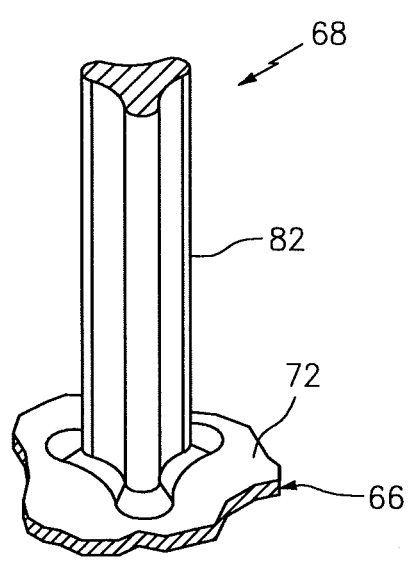
FIG. 7 is a perspective illustration of a portion of a protrusion included in a core of the acoustic panel of FIG. 6.
Figure 8:
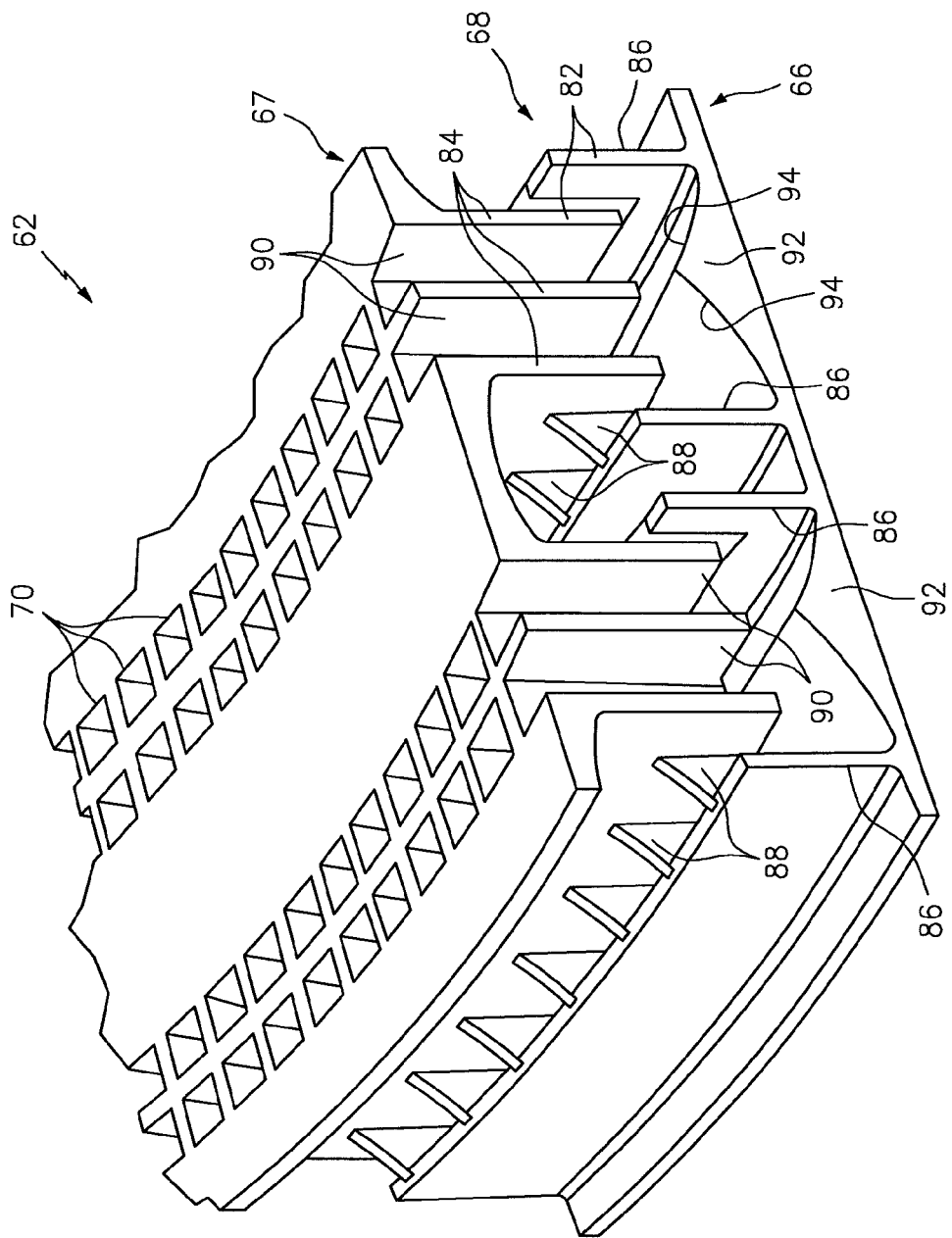
FIG. 8 is a perspective illustration of a portion of another acoustic panel.

Some or all of the interior chambers 76 may be fluidly discrete from one another; e.g., fluidly separated by respective portions (walls) of the core 68. Alternatively, referring to FIG. 5, one or more of the walls 78 may include one or more apertures 80 that fluidly couple some or all adjacent interior chambers 76 together. Still alternatively, referring to FIG. 6, the core 68 may include a plurality of protrusions 82 configured to form a more expansive (e.g., single and/or collective) interior chamber 76 within the acoustic panel 62; e.g., the protrusions 82 may replace one or more of the walls 78 of FIGS. 3 and 4. One or more of the protrusions 82 may each be configured as a column as illustrated in FIGS. 6 and 7. One or more of the protrusions 82 may alternatively or also each be configured as a baffle as illustrated in FIG. 8. The core 68, of course, is not limited to the exemplary structural configurations described above and illustrated in the drawings.

Each of the interior chamber 76 embodiments described above may function as a resonating cavity; e.g., a Helmholtz resonator. A lateral thickness of the acoustic panel 62 and, more particularly, the core 68 may be sized to tune the interior chamber(s) 76 and, thus, the resonating cavity(ies) to a specific target frequency or frequency range. In this manner, the acoustic panel 62 may be configured to reflect noise waves at the target frequency or frequency range in a manner that causes the reflected noise waves to destructively interfere with and attenuate subsequent noise waves traveling towards the acoustic panel 62. The acoustic panel 62, for example, may be configured to change the phase of the reflected noise waves to be opposite (e.g., ~180 degrees to) that of the subsequent incoming noise waves.

Typically, in order to attenuate relatively low frequency noise waves, an acoustic panel core is sized with a relatively large lateral thickness. In contrast, in an effort to reduce lateral core 68 thickness and/or increase noise attenuation effectiveness, some embodiments of the acoustic panel 62 of the present disclosure include one or more noise attenuating features as set forth above. These noise attenuating feature(s) may be configured within the internal chamber(s) 76 (internal to the panel 62) to increase nose wave reflections and/or propagation length within the chamber(s) 76. The noise attenuating feature(s) may also or alternatively be configured within the internal chamber(s) 76 to muffle the noise waves and/or absorb energy from the noise waves.

The noise attenuating features may have various configurations, some exemplary embodiments of which are described below with reference to FIGS. 8-19. One or more of the noise attenuating features may be attached to or formed integral with the core 68; e.g., see FIGS. 8, 12 and 13. One or more of the noise attenuating features may also or alternatively be attached to or fainted integral with the first layer 66; e.g., see FIGS. 8, 9, 12 and 13. One or more of the noise attenuating features may also or alternatively be attached to or formed integral with the second layer 67; e.g., see FIGS. 8-11 and 14-18.

It is worth noting, the acoustic panel 62 may be configured to include a single type of noise attenuating feature or alternatively a plurality of different types of noise attenuating features. Furthermore, each of the noise attenuating features may be configured for attenuating a single target frequency, or alternatively some of the noise attenuating features may be configured for attenuating a first target frequency while others may be configured for attenuating a second target frequency, etc.

Referring to FIG. 8, the noise attenuating features may include a plurality of baffles 84 and 86 (and/or tubes) and a plurality of webs 88. The baffles 84 may be configured into one or more arrays of tubes 90. Each of the tubes 90 may be connected to the second layer 67 and aligned with a respective one of the perforations 70. The baffles 86 may be arranged into one or more sets. Each set of the baffles 86 may include at least two of the baffles 86, which are arranged to provide walls on opposing sides of each respective array of tubes 90. Some of the baffles 86 may be interconnected with some of the baffles 84 by one or more of the webs 88 to provide the acoustic panel 62 with lateral rigidity as well as to provide additional reflective surfaces. With this configuration, the noise attenuating features (e.g., 84, 86, 88 and/or 92) divide the internal chamber 76 into a plurality of interconnected sub-chambers and collectively form the core 68 into a muffler; e.g., a multi-chambered muffler.

The noise attenuating features may also include a plurality of protrusions 92. These protrusions 92 may be arranged laterally opposite inner orifices of the tubes 90. Each protrusion 92 extends partially into the internal chamber 76, and may include one or more canted (e.g., deflection) surfaces 94 for directing incoming noise waves away from the tubes 90 and into other adjoining portions of the internal chamber 76 for attenuation.

Figure 9:
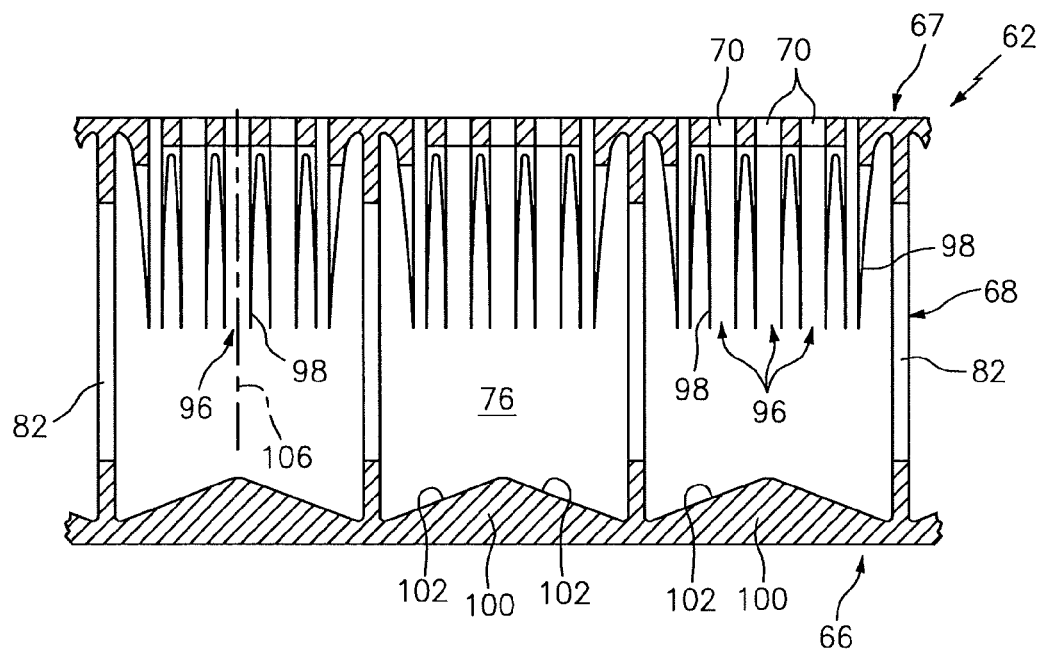
FIG. 9 is a cross-sectional illustration of a portion of another acoustic panel.
Figure 10:
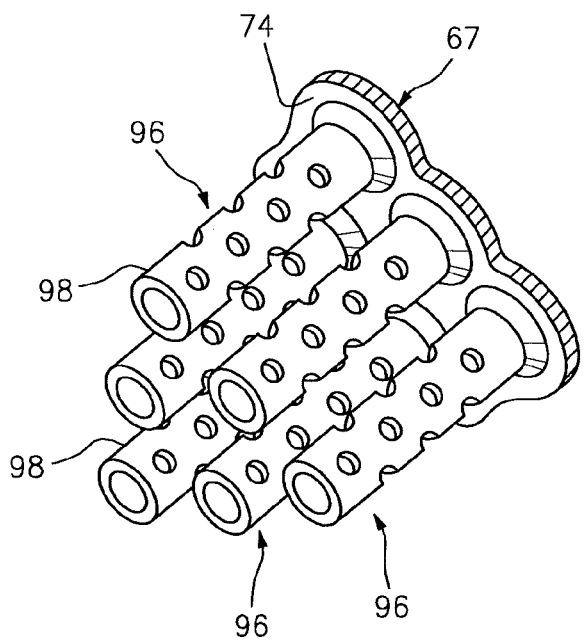
FIG. 10 is a perspective illustration of noise attenuating features included in the acoustic panel of FIG. 9.
Figure 14:
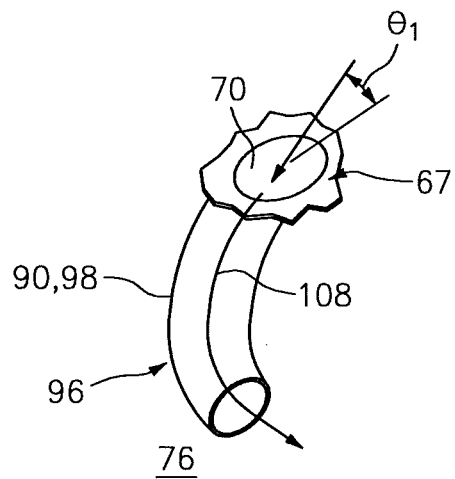
FIG. 14 is a perspective illustration of another noise attenuating feature.
Figure 17:
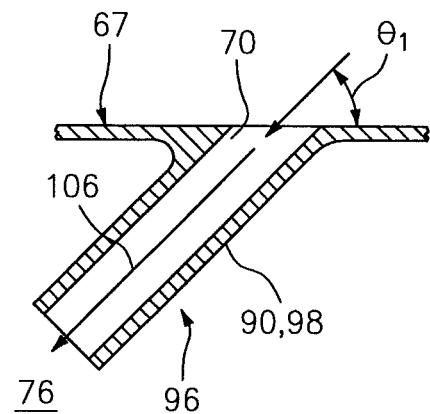
FIG. 17 is a cross-sectional illustration of another noise attenuating feature.
Figure 18:
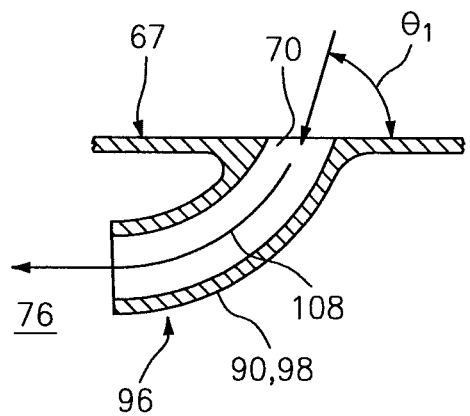
FIG. 18 is a cross-sectional illustration of another noise attenuating feature.
Figure 15:
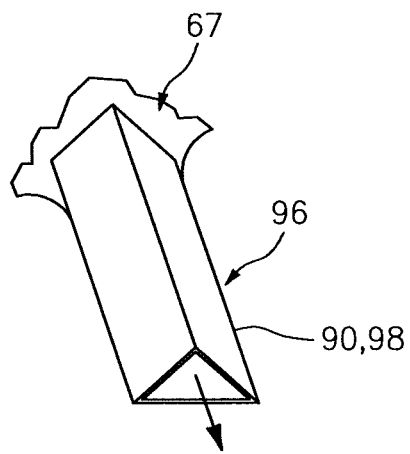
FIG. 15 is a perspective illustration of another noise attenuating feature.
Figure 16:
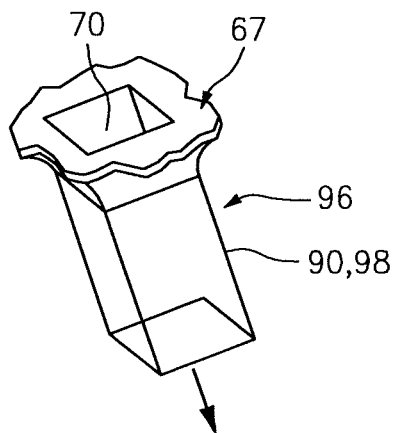
FIG. 16 is a perspective illustration of another noise attenuating feature.

Referring to FIGS. 9 and 10, the noise attenuating features may include one or more mufflers 96. Each of these muffles 96 may extend partially into a respective one of the internal chambers 76 (or into the collective internal chamber 76). For example, each of the mufflers 96 may include a tube 98 connected to the second layer 67. Each tube 98 may project partially into the internal chamber 76 from the second layer 67, and be aligned with a respective one of the perforations 70. In this manner, each tube 98 is fluidly and acoustically coupled between its respective perforation and the internal chamber 76. Each tube 98 may include a perforated sidewall as illustrated in FIG. 10. Alternatively, one or more of the tubes 98 may each include a solid (non-perforated) sidewall. A plurality of the mufflers 96 may be arranged in the same internal chamber 76 as illustrated in FIG. 9. Alternatively, an internal chamber 76 may be associated with a single discrete muffler 96 as illustrated in FIG. 11.

Referring to FIG. 9, the noise attenuating features may also include one or more protrusions 100. These protrusions 100 may be arranged laterally opposite inner orifices of the tubes 98 (e.g., mufflers 96). Each protrusion 100 extends partially into the internal chamber 76, and may include one or more canted (e.g., deflection) surfaces 102 for directing incoming noise waves away from the tubes 98 and into adjacent internal chambers 76 (or other portions of the same chamber 76) for attenuation. Each protrusion 100 may be configured as, for example, a cone or a pyramid.

Referring to FIGS. 12 and 13, the noise attenuating features may include one or more protrusions 104. These protrusions 104 may be arranged into one or more arrays, and respectively connected to the core 68, the first layer 66 and/or the second layer 67. The protrusions 104 in each array may be sized to provide respective acoustic panel portions defining the interior chamber(s) 76 with a textured surface. The protrusions connected to the first layer 66, for example, may be sized to provide at least a portion of the interior surface 72 with a surface roughness between, for example, about 250 Ra (μin) and about 2,000 Ra (μin). Of course, in other embodiments, the surface roughness may be less than 250 Ra or greater than 2,000 Ra. Note, the protrusions 104 illustrated in FIGS. 12 and 13 are exaggerated for ease of illustration. The protrusions 104 connected to the second layer 67 and/or the core 68 may also or alternatively be sized in a similar matter. It is worth noting, the protrusions 104 within the same internal chamber 76 may have substantially the same size (e.g., height) as illustrated in FIG. 12, or various sizes (e.g., heights) as illustrated in FIG. 13. It is also worth noting, the sizes and/or the configurations of the protrusions 104 may be varied between different interior chambers 76 as well as different regions of the same chamber 76. Furthermore, one or more regions of a surface may be configured with protrusions to provide texture while one or more of other regions of that same surface may be configured without protrusions such that these regions are substantially smooth.

Figure 19:
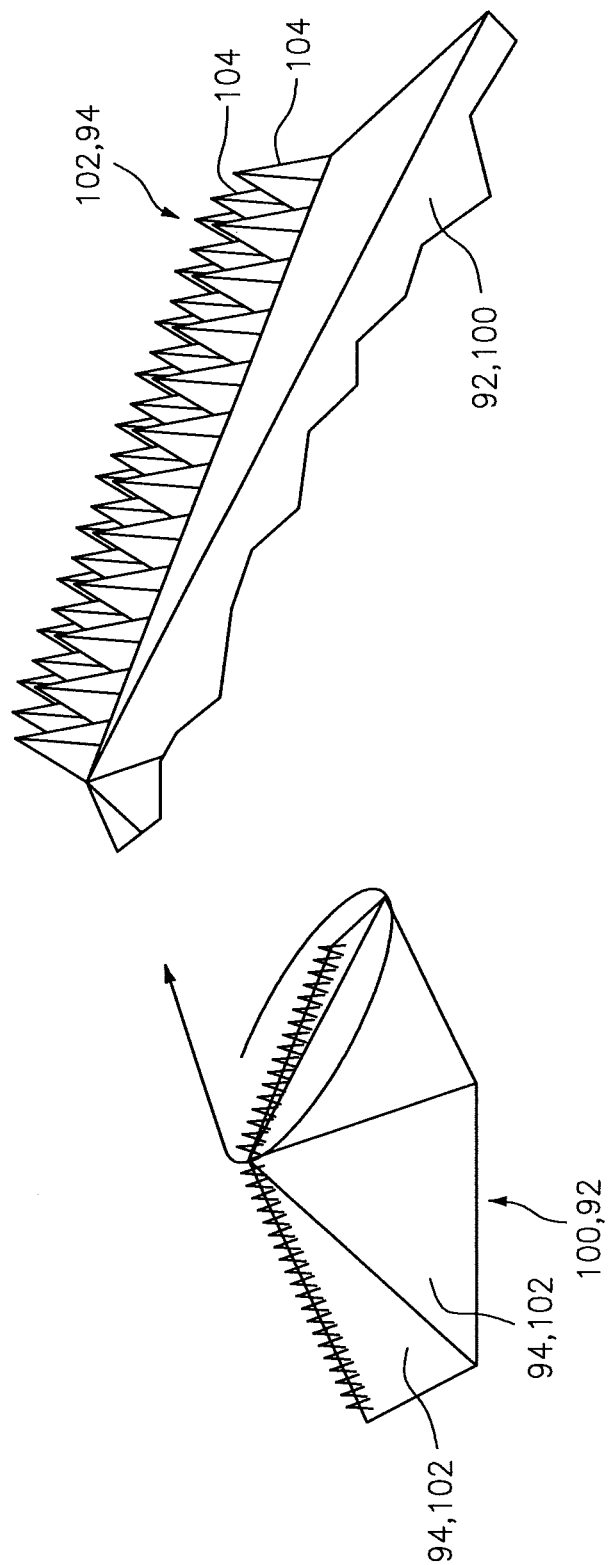
FIG. 19 is a perspective illustration of other noise attenuating feature adjacent an enlarged portion thereof.

One or more components (e.g., the layers 66, 67, the core 68 and/or the noise attenuating features) of the acoustic panel 62 may have an alternative configuration to those described above. For example, one or more of the tubes 90, 98 (e.g., mufflers 96) may each have a circular cross-sectional geometry (see FIG. 14), a triangular cross-sectional geometry (see FIG. 15), a square cross-sectional geometry (see FIG. 16), or any other type of curvilinear and/or polygonal cross-sectional geometry. One or more of the tubes 90, 98 (or other protrusions) may each have and extend along a substantially straight centerline 106 or trajectory (see FIGS. 9 and 17), or a non-straight (e.g., curved) centerline 108 or trajectory (see FIGS. 14 and 18). The centerline 106, 108 may be substantially perpendicular to a respective portion of the panel 62 to which the feature is connected (see FIG. 9), or acutely angled to the respective portion of the panel 62 to which the feature is connected (see FIGS. 17 and 18). Referring to FIG. 19, one or more of the noise attenuating features (e.g., 104) may be configured onto another one of the noise attenuating features (e.g., 92, 100) to provide that base feature (e.g., 92, 100) with, for example, a textured surface. Furthermore, while the protrusions (e.g., 92, 100) with canted surfaces and/or the protrusions (e.g., 104) providing the textured surfaces are illustrated as cones or pyramids or the like in the figures, one or more of these protrusions may be configured with alternative geometries; e.g., parti-spherical, cuboid, elongated rib, etc. The acoustic panel 62 and its components therefore are not limited to the exemplary embodiments described herein.

The acoustic panel 62 may be manufactured using one or more manufacturing processes which include, but are not limited to, additive manufacturing, casting, milling, forging, chemical etching, laser sculpting and machining. One or more of the components (e.g., the layers 66, 67, the core 68 and/or the noise attenuating features) of the acoustic panel 62 may be formed integral with one another; e.g., formed as a single unitary body. Alternatively or in addition, one or more of the components of the acoustic panel 62 may be formed discrete from one another; e.g., as physically separate units. These discrete components may subsequently be assembled and attached to one another; e.g., mechanically fastened and/or bonded.

The term "additive manufacturing" may describe a process where an additive manufacturing system builds up a part or parts in a layer-by-layer fashion. For example, for each layer, the additive manufacturing system may spread and compact a layer of additive manufacturing material (e.g., metal powder and/or non-metal powder) and solidify one or more portions of this material layer with an energy beam; e.g., a laser beam or an electron beam. Examples of an additive manufacturing system include, but are not limited to, a laser sintering system, an electron beam system, a laser powder deposition system and an EB wire deposition system. Examples of metals from which the acoustic panel 62 may be formed include, but are not limited to, aluminum (Al), nickel (Ni), titanium (Ti), steel, stainless steel, cobalt (Co), chromium (Cr), tungsten (W), molybdenum (Mo) and/or alloys including one or more of the foregoing metals such as Waspaloy, Stellite, etc. Examples of non-metals from which the acoustic panel 62 may be formed include, but are not limited to, ceramic and polymer. The acoustic panel 62, however, is not limited to being formed from the foregoing materials. Furthermore, the acoustic panel 62 may be formed from a single material or various portions and/or components of the acoustic panel 62 may be formed from different materials.

It is worth noting, manufacturing the acoustic panel 62 utilizing additive manufacturing enables the internal chamber(s) 76 to be defined by relatively complex reflective surfaces as described above. These types of complex configurations ordinarily would be cost prohibitive and/or infeasible to manufacture solely using other types of manufacturing methods. Additive manufacturing may also or alternatively enable the acoustic panel to include one or more relatively complex noise attenuating features; e.g., mufflers. Additive manufacturing also may enable all of the perforations 70 to be aligned with its respective chamber 76, opposed to being aligned with one of the walls 78. However, as indicated above, the present disclosure is not limited to using additive manufacturing to form the acoustic panel 62. The components of the acoustic panel 62, for example, may alternatively be cast or machines and attached together.

The terms "upstream", "downstream", "inner" and "outer" are used to orientate the elements described above relative to the turbine engine 20 and its centerline 22. One or more of these elements, however, may be utilized in other orientations than those described above. The present invention therefore is not limited to any particular spatial orientations.

The acoustic panel 62 may be included in various turbine engines other than the one described above as well as in other types of rotational equipment, industrial equipment, etc. The acoustic panel 62, for example, may be included in a geared turbine engine where a gear train connects one or more shafts to one or more rotors in a fan section, a compressor section and/or any other engine section. Alternatively, the acoustic panel 62 may be included in a turbine engine configured without a gear train. The acoustic panel 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present disclosure therefore is not limited to any particular types or configurations of turbine engines or equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An acoustic panel, comprising:
   a first layer;
   a perforated second layer;
   a core forming a chamber between the first and the second layers;
   a plurality of noise attenuating features projecting partially into the chamber, each of the noise attenuating features formed integral with at least one of the first layer, the second layer or the core; and a protrusion comprising an internal canted surface that projects, partially into a cavity within the core, away from the first layer to a peak of the protrusion, the peak disposed a non-zero distance from the second layer;

wherein each of a first set of the noise attenuating features projects partially into the chamber from the first layer to a respective distal end, and a gap is between the distal end and the second layer;

wherein one of the noise attenuating features comprises a tube fluidly coupled with a perforation in the second layer, and the internal canted surface is positioned opposite an orifice of and disposed outside of the tube.

2. The acoustic panel of claim 1, wherein one of the noise attenuating features comprises a baffle.

3. The acoustic panel of claim 1, wherein one of the noise attenuating features comprises a muffler.

4. The acoustic panel of claim 1, wherein the tube is fluidly coupled between the perforation in the second layer and the chamber.

5. The acoustic panel of claim 4, wherein a sidewall of the tube is perforated.

6. The acoustic panel of claim 1, wherein one of the noise attenuating features is configured as a cone or a pyramid.

7. The acoustic panel of claim 1, wherein the noise attenuating features are configured to provide at least a portion of a surface, which defines at least a portion of the chamber, with a surface roughness between about 250 Ra and about 2,000 Ra.

8. The acoustic panel of claim 1, wherein
the core further forms a second chamber between the first and the second layers; and
the chamber and the second chamber are fluidly discrete.

9. The acoustic panel of claim 1, wherein
the core further forms a second chamber between the first and the second layers; and
the chamber and the second chamber are fluidly coupled through one or more apertures in the core.

10. The acoustic panel of claim 1, wherein the core includes one or more protrusions that extend between the first and the second layers through the chamber.

11. The acoustic panel of claim 1, wherein the core is formed integral with at least one of the first layer or the second layer.

12. The acoustic panel of claim 1, wherein a second set of the noise attenuating features project partially into the chamber from the first layer.

13. An apparatus for a turbine engine, the apparatus comprising:
an acoustic panel including a first layer, a perforated second layer and a muffler between the first layer and the second layer;
wherein the muffler is configured internally within the panel and to attenuate noise generated during operation of the turbine engine;
wherein the muffler comprises one or more tubes, each of the one or more tubes is fluidly coupled with a respective perforation in the second layer;
wherein the acoustic panel includes a protrusion comprising one or more internal canted surfaces aligned with, positioned opposite an orifice of and disposed outside of each of the one or more tubes;
wherein a first of the one or more internal canted surfaces projects, partially into a cavity within the acoustic panel, away from the first layer to a peak of the protrusion; and
wherein the peak is disposed a non-zero distance from the second layer.

14. The apparatus of claim 13, wherein the muffler extends between the first and the second layers.

15. The apparatus of claim 13, wherein the muffler comprises a plurality of baffles configured to form a plurality of chambers within the acoustic panel.

16. The apparatus of claim 15, wherein at least some of the baffles are interconnected by one or more webs.

17. The apparatus of claim 13, wherein the one or more tubes project partially into a chamber and towards the one or more internal canted surfaces.

18. A manufacturing method, comprising:
forming an acoustic panel, the acoustic panel comprising a plurality of noise attenuating features projecting partially into an internal chamber of the acoustic panel;
wherein at least one of the noise attenuating features is formed using an additive manufacturing system; and
wherein each of a first set of the noise attenuating features projects partially into the chamber from a first layer to a respective distal end, a second set of the noise attenuating features project partially into the chamber from a second layer, and a gap is between the distal end and the second layer;
wherein the acoustic panel further comprises a protrusion with an internal canted surface that projects, partially into a cavity within the acoustic panel, away from the first layer to a peak of the protrusion, and the peak is disposed a non-zero distance from the second layer; and
wherein one of the second set of the noise attenuating features comprises a tube fluidly coupled with a perforation in the second layer, and the internal canted surface is positioned opposite an orifice of and disposed outside of the tube.

19. The manufacturing method of claim 18, wherein the acoustic panel is formed as a unitary body using the additive manufacturing system.

* * * * *